US009668469B2

(12) United States Patent
Leventini (10) Patent No.: US 9,668,469 B2
(45) Date of Patent: Jun. 6, 2017

(54) DECOY SYSTEM AND METHOD (71) Applicant: Dario Leventini, Acampo, CA (US)

(72) Inventor: Dario Leventini, Acampo, CA (US)

( * ) Notice: Subject to any disclaimer, the term of this patent is extended or adjusted under 35 U.S.C. 154(b) by 32 days.

(21) Appl. No.: 14/220,734

(22) Filed: Mar. 20, 2014

(65) Prior Publication Data
US 2014/0338248 A1 Nov. 20, 2014

Related U.S. Application Data

(63) Continuation-in-part of application No. 13/898,183, filed on May 20, 2013, now abandoned.

(51) Int. Cl.
*A01M 31/06* (2006.01)
(52) U.S. Cl.
CPC .................. *A01M 31/06* (2013.01)
(58) Field of Classification Search
CPC ............................. A01M 31/00; A01M 31/06
USPC ........................................................ 43/2, 3
See application file for complete search history.

(56) References Cited

U.S. PATENT DOCUMENTS

| | | | | |
|---|---|---|---|---|
| 1,836,504 | A * | 12/1931 | Prince .................. | A01M 31/06 43/3 |
| 2,252,795 | A * | 8/1941 | Weems ................. | A01M 31/06 43/3 |
| 2,624,144 | A * | 1/1953 | Beverman ............. | A01M 31/06 43/3 |
| 2,726,469 | A * | 12/1955 | Becker ................. | A01M 31/06 43/3 |
| 3,016,647 | A | 1/1962 | Peterson et al. | |
| 4,141,167 | A | 2/1979 | Muehl | |
| 4,535,560 | A | 8/1985 | O'Neil | |
| 4,599,819 | A * | 7/1986 | Voges, Jr. ............ | A01M 31/06 43/2 |
| 4,910,905 | A | 3/1990 | Girdley et al. | |
| 5,074,071 | A * | 12/1991 | Dunne .................. | A01M 31/06 43/2 |
| 5,974,720 | A | 11/1999 | Bowling | |
| 6,079,140 | A | 6/2000 | Brock, IV | |
| 6,138,396 | A * | 10/2000 | Capps .................. | A01M 31/06 43/3 |
| 6,374,529 | B1 | 4/2002 | Petroski et al. | |
| 6,442,885 | B1 * | 9/2002 | Payne ................... | A01M 31/06 43/3 |
| 6,834,458 | B1 * | 12/2004 | Hand, III .............. | A01M 31/06 43/2 |
| 6,957,509 | B2 * | 10/2005 | Wright ................. | A01M 31/06 43/2 |
| 7,963,064 | B2 * | 6/2011 | Smith ................... | A01M 31/06 43/2 |

(Continued)

OTHER PUBLICATIONS

Canadian Office Action, Nov. 12, 2015, Dario Leventini.
Mexican Office Action, Jul. 29, 2016, Dario Leventini.
Second Canadian Office Action, Aug. 16, 2016, Dario Leventini.

*Primary Examiner* — David Parsley
(74) *Attorney, Agent, or Firm* — Steven R. Vosen (57) ABSTRACT

A system and method for providing floating decoys is described. The system includes a mechanism for moving tethered decoys in a motion that mimics the natural movement of floating waterfowl. The mechanism includes a motor that moves one end of the tether in a circular, or approximately circular motion along the surface of the water. The decoys then move back and forth on the surface of the water.

13 Claims, 10 Drawing Sheets

(56) References Cited

U.S. PATENT DOCUMENTS 8,479,436 B2 * 7/2013 Elliott .................. A01M 31/06
43/2

* cited by examiner

DECOY SYSTEM AND METHOD

CROSS-REFERENCE TO RELATED APPLICATIONS

This application is a continuation-in-part of application Ser. No. 13/898,183, filed May 20, 2013, the contents of which are hereby incorporated by reference in its entirety.

BACKGROUND OF THE INVENTION

Field of the Invention

The present invention generally relates to the field of small game hunting, and more specifically to a decoy system and method for use in bird hunting, particularly waterfowl hunting.

Discussion of the Background

Decoy systems are used by hunters to lure water fowl. Such systems use floating decoys, such as wooden models of ducks, that are constrained or forced to move in a natural motion. The decoys are tethered to the ground (such as the bottom or shore of a lake, for example). In some systems, the motion of the water is sufficient to cause the decoys to move. In other systems, the tether is pulled or moved to cause the decoy to move on the surface of the water.

In general, prior art decoy systems are complex and/or do not provide a natural, random motion of floating waterfowl.

Thus there is a need in the art for a decoy system that is easy to use and that simulates realistic, random floating decoy motions.

BRIEF SUMMARY OF THE INVENTION

The present invention overcomes the disadvantages of prior art decoy systems by moving the decoys back and forth over a small distance on the water.

Certain embodiments provide a decoy system for moving decoys on the surface of a body of water. The system includes a line having a first end and a second end; one or more floating decoys attached to said line; and a mechanism that moves said first end in a direction that is at least partially perpendicular to the line at said first line end. When said mechanism moves said first line end, at least one of said one or more decoys move in a direction at least partially perpendicular to the line near said at least one decoy.

Certain other embodiments provide a decoy system for moving decoys on the surface of a body of water. The decoy system includes a first stake assembly for placing in the ground; a second stake assembly for placing in the ground; a line extending from a first end attached to said first stake assembly and a second end attached to said second stake assembly; a mechanism that moves said first line end in a direction that is at least partially perpendicular to the line at said first line end; and one or more decoys attached to said line. When said first stake assembly and said second stake assembly are placed in the ground, said one or more decoys float on the surface of the water. When said mechanism moves said first line end, at least one of said one or more decoys move in a direction at least partially perpendicular to the line near said at least one decoy.

Certain embodiments provide a method of moving decoys on the surface of a body of water. The method includes placing one or more tethered floating decoys on the water, where the tether includes a first end and a second end; and moving said first end in a direction that is at least partially perpendicular to said line at said first end. At least one of said one or more decoys move in a direction at least partially perpendicular to the line near said at least one decoy.

These features together with the various ancillary provisions and features which will become apparent to those skilled in the art from the following detailed description, are attained by the decoy system of the present invention, preferred embodiments thereof being shown with reference to the accompanying drawings, by way of example only, wherein:

BRIEF DESCRIPTION OF THE SEVERAL VIEWS OF THE DRAWING

FIGS. 3A-3D are bottom views of the movement mechanism of FIG. 1 in four sequential positions, where.

FIGS. 4A-4D are top views of the embodiment of FIG. 1 in four sequential positions, corresponding to FIGS. 3A-3D, where.

FIGS. 6A-6D are bottom views of the movement mechanism of FIG. 5 in four sequential positions, where.

FIGS. 8A-8D is a side view 8-8 of the movement mechanism of FIG. 7 in four sequential positions, where.

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
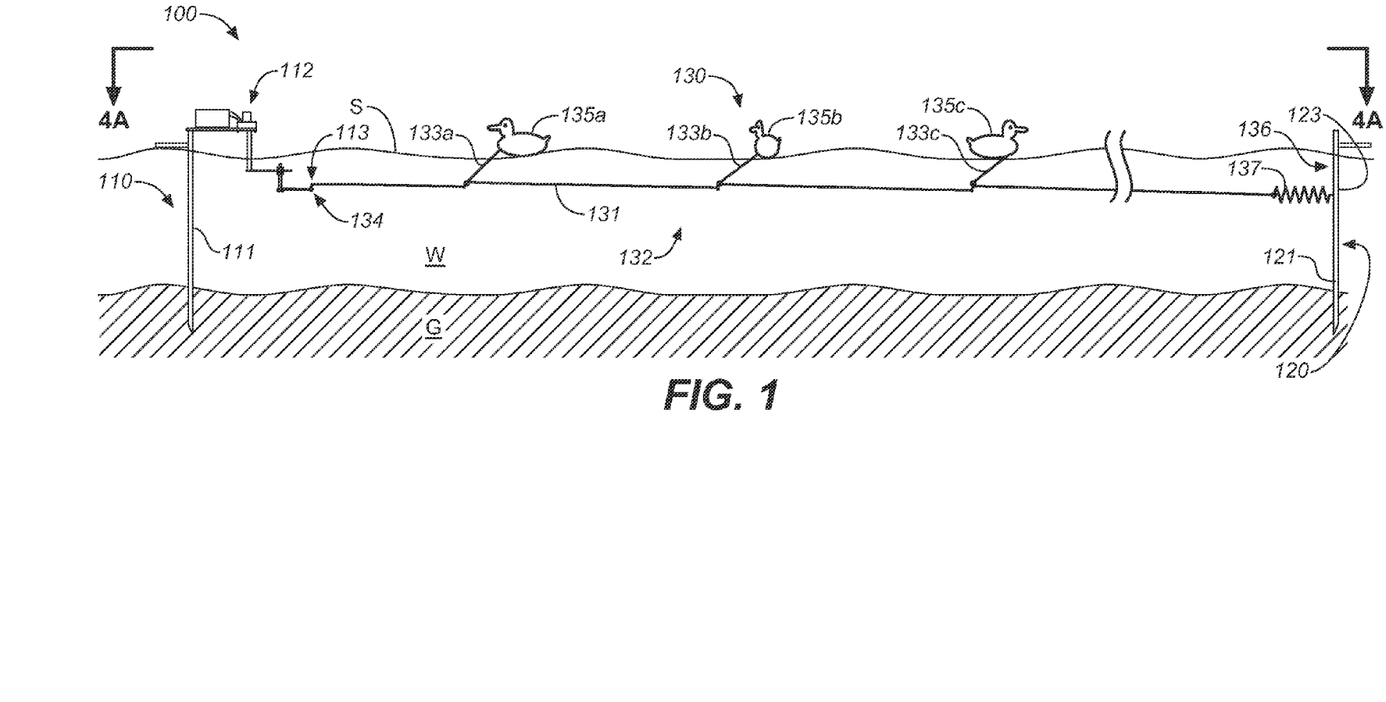
FIG. 1 is a side view of a first embodiment decoy system.

FIG. 1 is a side view of a first embodiment decoy system 100 that is illustrated, for example, on a body of water W, such as a lake or pond, having a surface S and a bottom G. System 100 includes a decoy assembly 130 attached to a first stake assembly 110 and a second stake assembly 120. Decoy assembly 130 includes one or more floating decoys 135 and is secured to a lake bottom G by stake assemblies 110 and 120. More specifically, stake assembly 110 includes a stake 111 for inserting into lake bottom G and a movement mechanism 112 having a line attachment 113, and second stake assembly 120 includes a stake 121 for inserting into the lake bottom and a line attachment 123. While stakes 111 and 121 are illustrated in FIG. 1 as being inserted into the bottom of water W, one or both of stakes may be inserted into the shore of water W. Optionally, one or more of ends 110 or 120 may be secured to other objects, such as to a dock.

Decoy assembly 130 includes a line 132 with a first end 134, shown attached to first stake line attachment 113, and a second end 136, shown attached to second stake line attachment 123 In one embodiment, line 132 is at least partially elastic. In another embodiment, line 132 includes a combination of elastic and inelastic portions, where FIG. 1 shows one embodiment of line 132 as including: an inelastic portion 131, which may be a cord formed from a synthetic material, such as a monofilament line, and which includes first end 134, and an elastic portion, such as a rubber band, or spring 137, which includes second end 136.

Decoy assembly 130 includes one or more floating decoys 135, illustrated, for example and without limitation, as decoys 135a, 135b, and 135c. Each decoy is attached to line 132 by a tether 133. Decoys 135a, 135b, and 135c are shown, for example as being attached to line 132 by tethers 133a, 133b, and 133c, respectively.

In another embodiment, system 100 includes adjustable elements. Thus, for example, the height of line attachments 134 and/or 123 are adjustable by providing discrete attachment points on stake 121 and/or 111 provided, or are provided on a movable collar to be continuously adjustable. In another embodiment, discrete or continuously adjustable radial attachment is provided for line attachment 134, such as along the length of arm 209.

Figure 2:
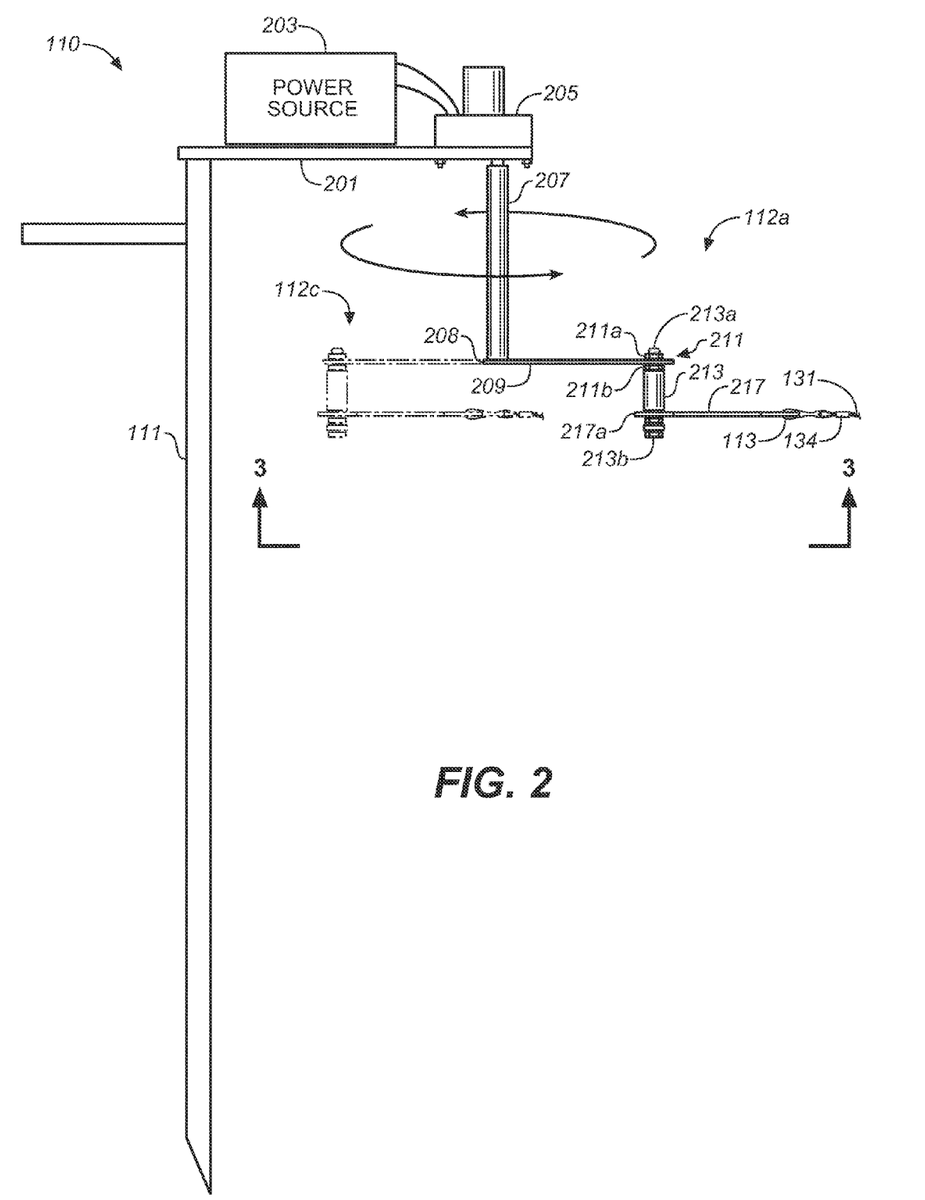
FIG. 2 is a side view of one embodiment of a first stake assembly that can be used with the decoy system of FIG. 1.

FIG. 2 is a side view of one embodiment of first stake assembly 110 that can be used with the decoy system of FIG. 1. Specifically, first stake assembly 110 includes an element 201 attached to stake 111 that supports movement mechanism 112. Mechanism 112 includes a power source 201 and motor 205 that are both attached to element 201, a shaft 207 that protrudes from motor 205, an arm 209 that is rigidly connected to shaft 207 at connection 208, a shaft 213 that is rotatably connected to arm 209 at connection 211, and an element 217 that is rotatably attached to shaft 213 and includes line attachment 113.

In one embodiment, shaft 213 is a lag bolt that includes a threaded end 213a and a head 213b. Shaft 213 passes through a hole (not shown) in arm 209. Connection 211 includes a pair of nuts 211a and 211b on either of the hole of arm 209. In another embodiment, element 217 is, for example, an eye bolt having an eye 217a which is loosely supported by head 213b.

As described subsequently, power that is applied to motor 205 from power source 203 causes shaft 207 and arm 209 to rotate about the axis of shaft 207. Thus as shaft 207 rotates, shaft 213 executes circular motion about the axis of shaft 207, allowing line attachment 113 to execute a circular motion or some other more complicated motion depending on forces applied by line 132 on mechanism 112. This motion causes mechanism 112 to assume, for example, four sequential positions, shown in FIGS. 3 and 4, labeled as positions 112a, 112b, 112c, and 112d. FIG. 2 shows configuration 112a in solid lines and configuration 112c in dashed lines.

Figure 3A:
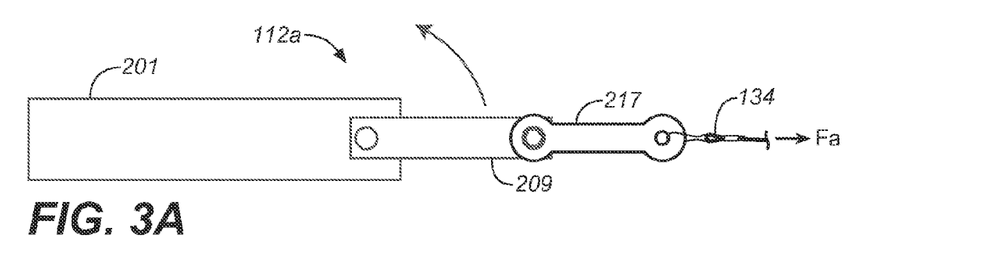
FIG. 3A is the movement mechanism in a first position.
Figure 3B:
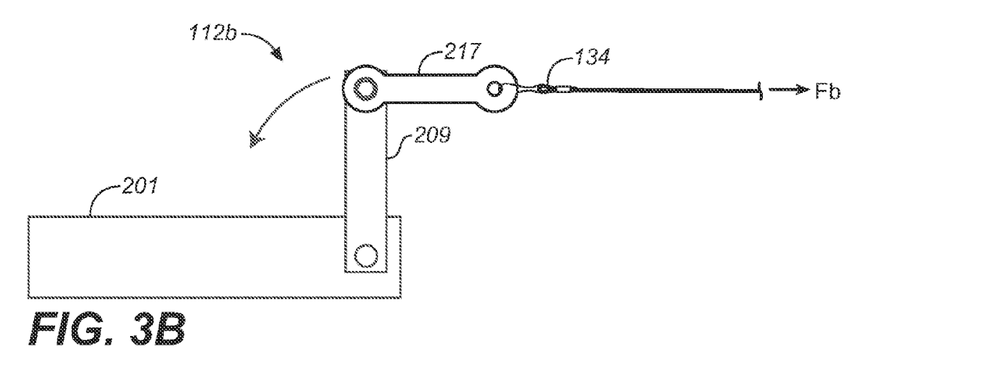
FIG. 3B is the movement mechanism in a second position.
Figure 3C:
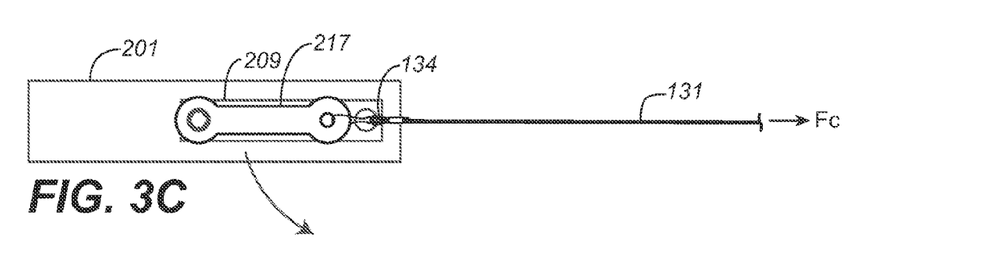
FIG. 3C is the movement mechanism in a third position.
Figure 3D:
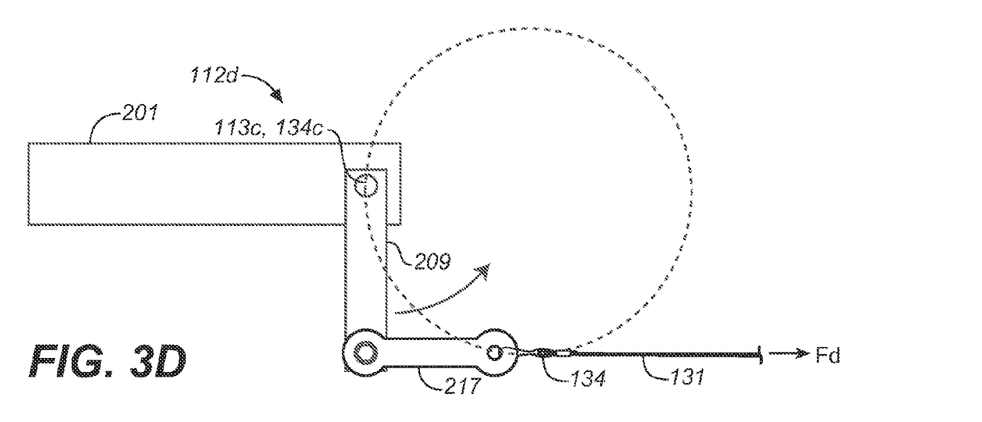
FIG. 3D is the movement mechanism in a fourth position.
Figure 4A:
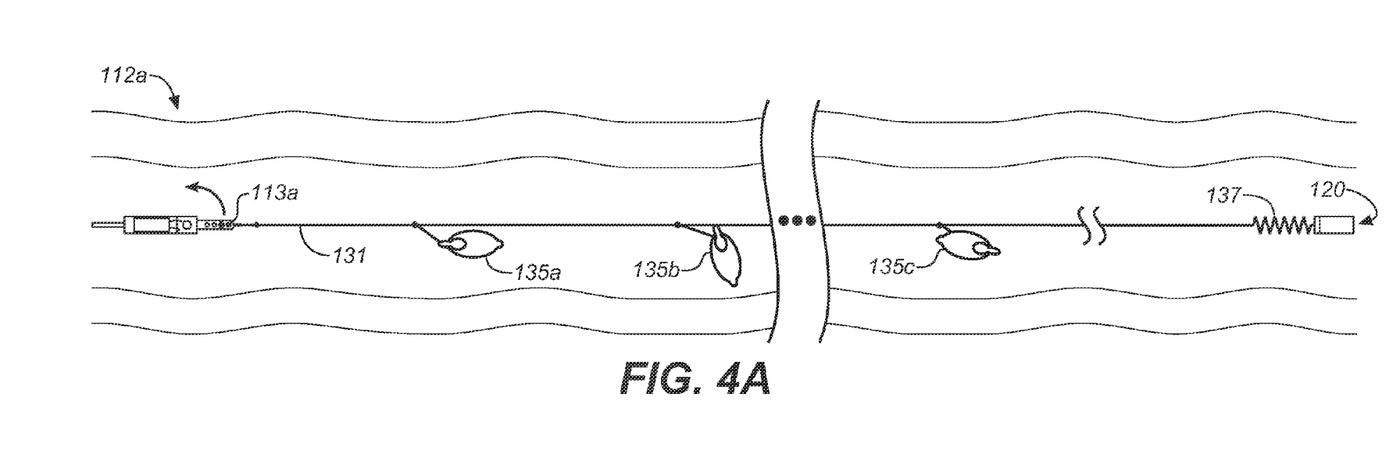
FIG. 4A is the decoy system with the movement mechanism in a first position.
Figure 4B:
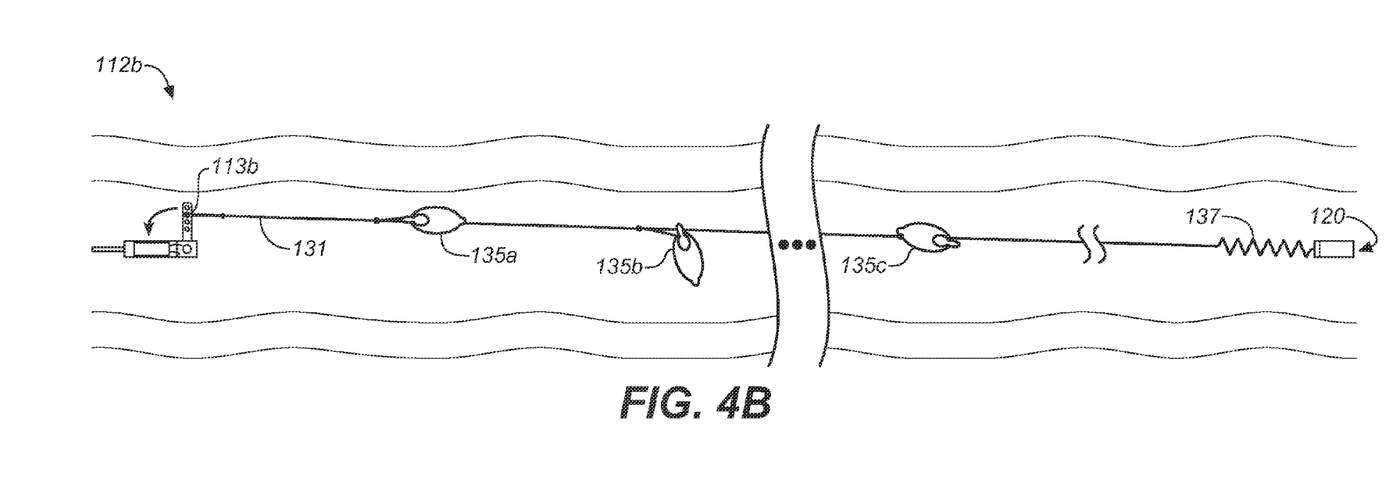
FIG. 4B is the decoy system with the movement mechanism in a second position.
Figure 4C:
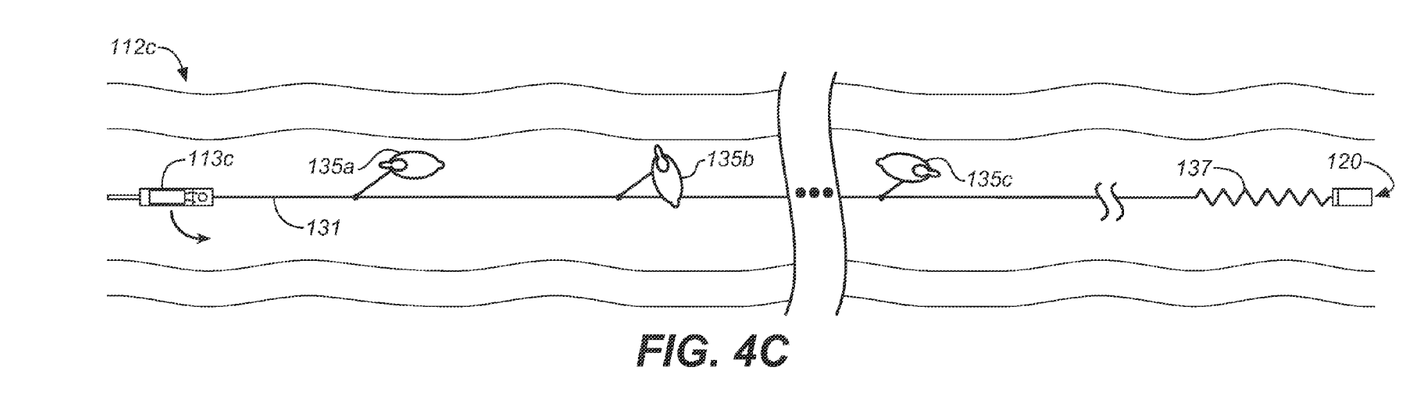
FIG. 4C is the decoy system with the movement mechanism in a third position.
Figure 4D:
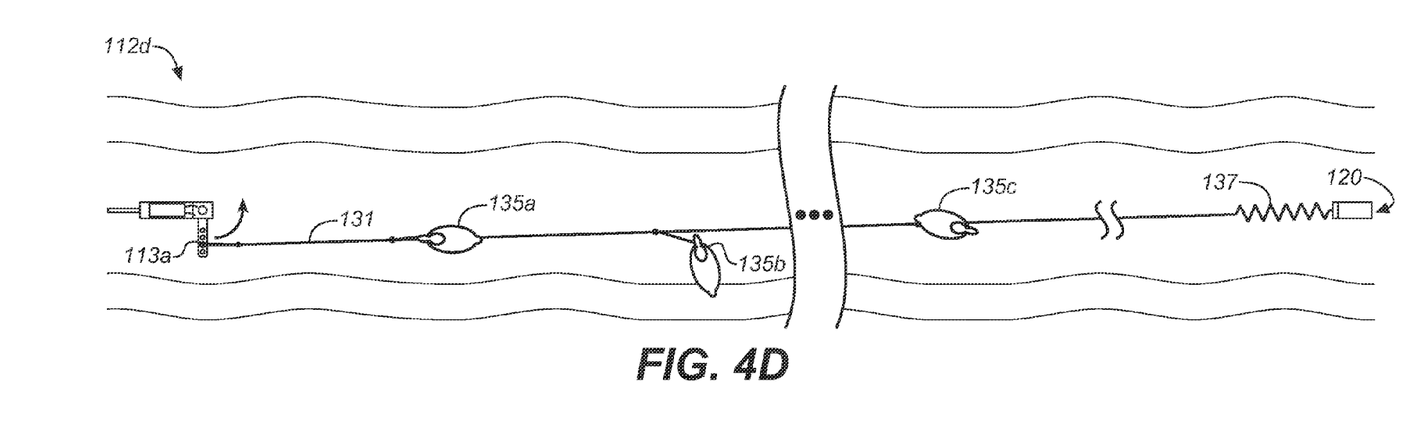
FIG. 4D is the decoy system with the movement mechanism in a fourth position.

FIGS. 3A-3D are bottom views of the movement mechanism of FIG. 1 in four sequential positions, and FIGS. 4A-4D are top views corresponding to FIGS. 3A-3D, where: FIGS. 3A and 4A show the decoy system in a first position 112a and having a first line attachment position 113a, FIGS. 3B and 4B show the decoy system in a second position 112b and having a second line attachment position 113b, FIGS. 3C and 4C show the decoy system in a third position 112c and having a third line attachment position 113c, and FIGS. 3D and 4D show the decoy system in a fourth position 112d and having a fourth line attachment position 113d.

As shown in FIGS. 3A-3D and 4A-4D, mechanism 112 rotates arm 209 in a circular motion, where the rotation between sequential FIGS. 3A/4A, 3B/4B, 3C/4C, and 3D/4D is 90 degrees. Line 132 is secured at end 134 to mechanism 112 and by end 136 to stake assembly 123. The elasticity of line 132 results in a force on line attachment 113, shown as force Fa on first line attachment 113a position in FIG. 3A, force Fb on second line attachment position 113b in FIG. 3B, force Fc on third line attachment position 113c in FIG. 3C, and force Fd on fourth line attachment 113d in FIG. 3D. The forces on the line attachment cause the line to remain taut as mechanism 112 rotates, causing line end 134 to move perpendicular to the length of the line. In certain embodiments, the such as when the length of line 132 is very long, the force on mechanism 112 from line 132 (such as forces Fa, Fb, Fc, and Fd) are substantially parallel, as shown in FIG. 3, and line end 134 moves in an approximately circular motion, as shown in the dashed circle in FIG. 3D. If the forces are not parallel, as caused by a short line 132, the resulting motion of line end 134 maybe an oval or some other non-circular closed path.

FIGS. 3A-3D also show that, as end 134 moves, decoys 135 move back and forth. As a result of the rotation of motor 205, each decoy 135 executes a nearly circular motion.

Figure 5:
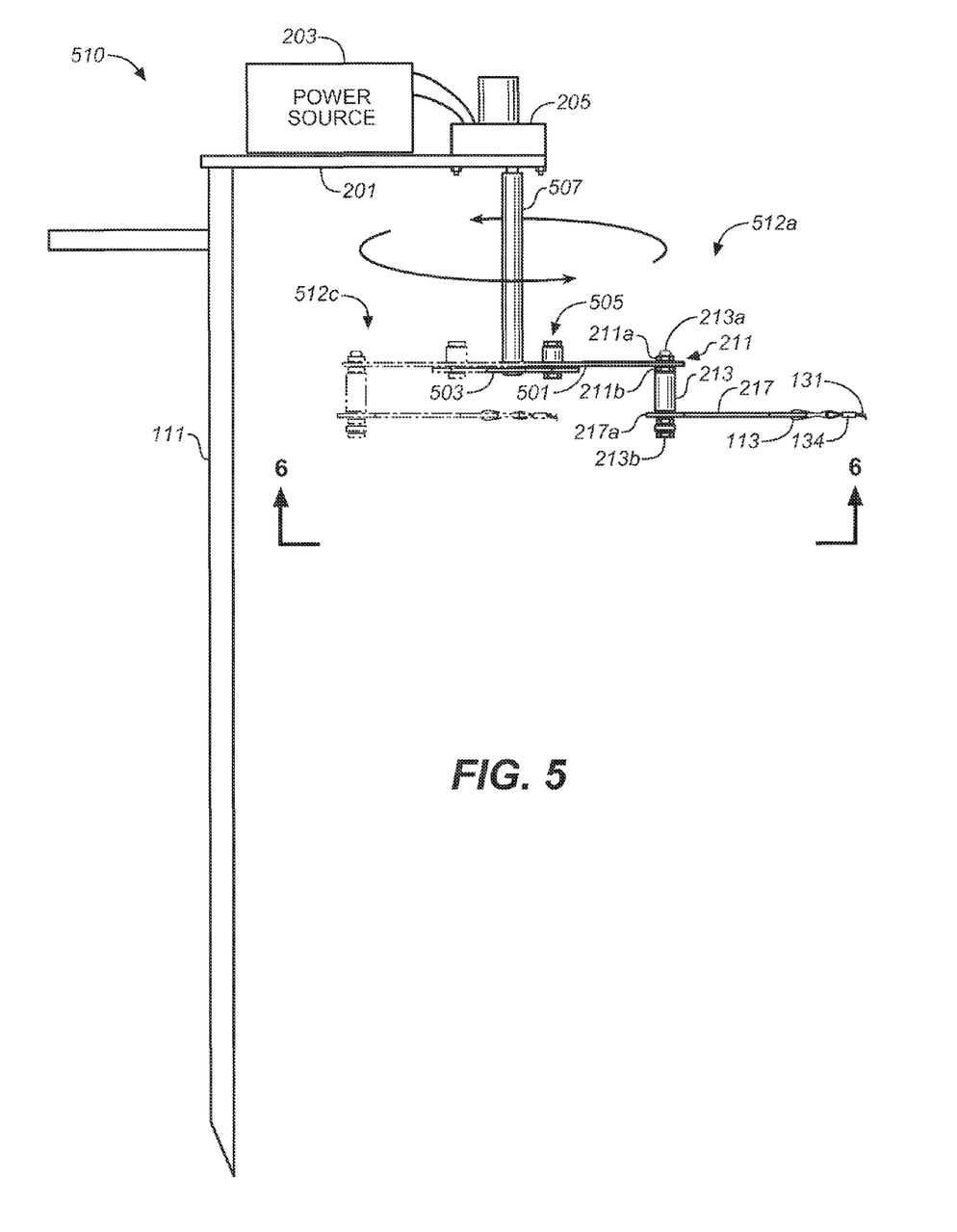
FIG. 5 is a side view of a second embodiment of a stake assembly that can be used with the decoy system of FIG. 1.
Figure 5A:
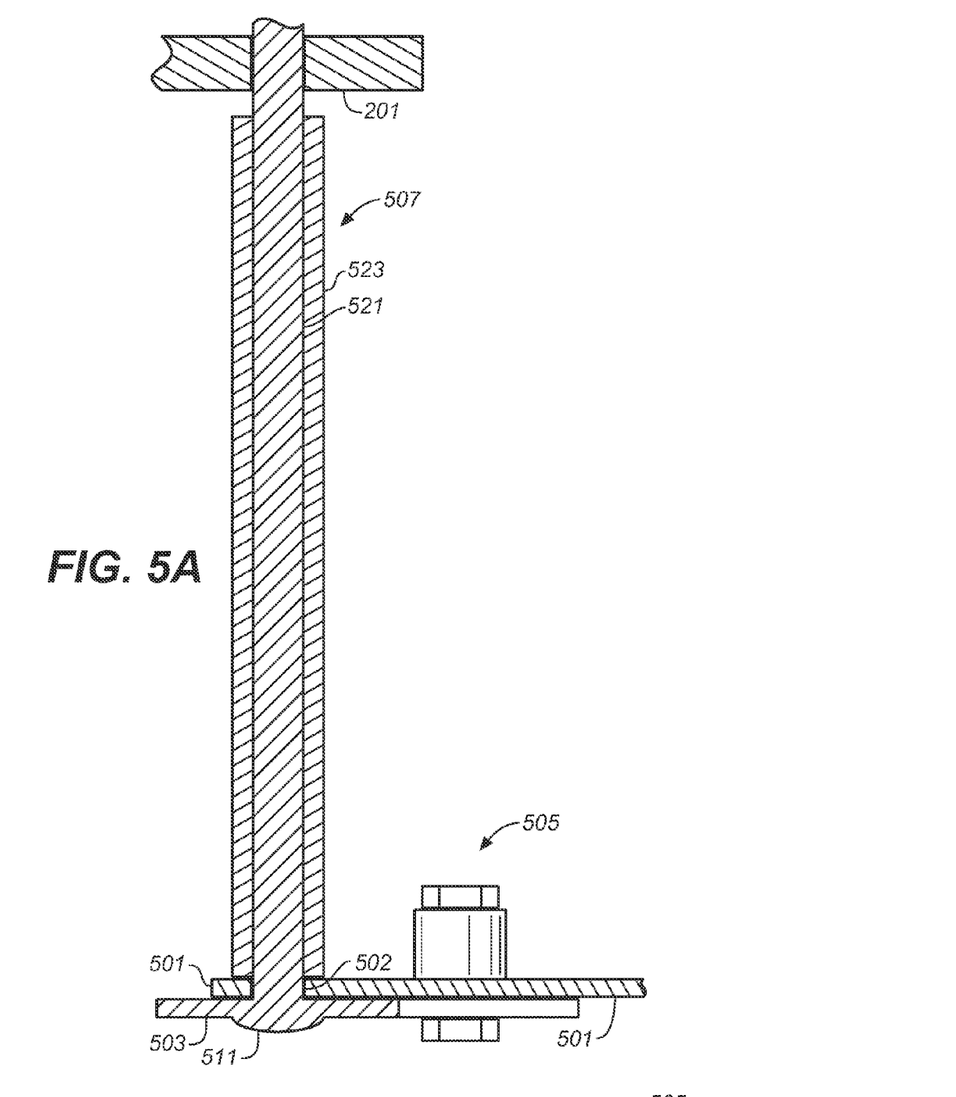
FIG. 5A is a sectional view 5A-5A of FIG. 6A.
Figure 5B:
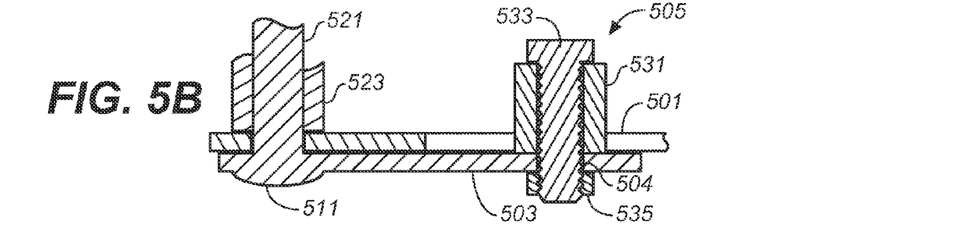
FIG. 5B is a sectional view 5B-5B of FIG. 6A.
Figure 6A:
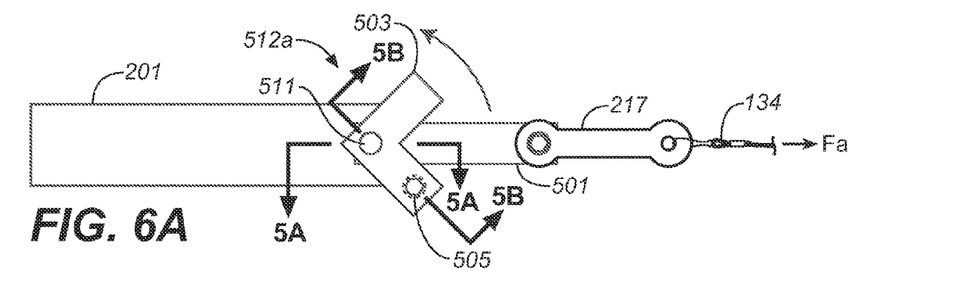
FIG. 6A is the movement mechanism in a first position.
Figure 6B:
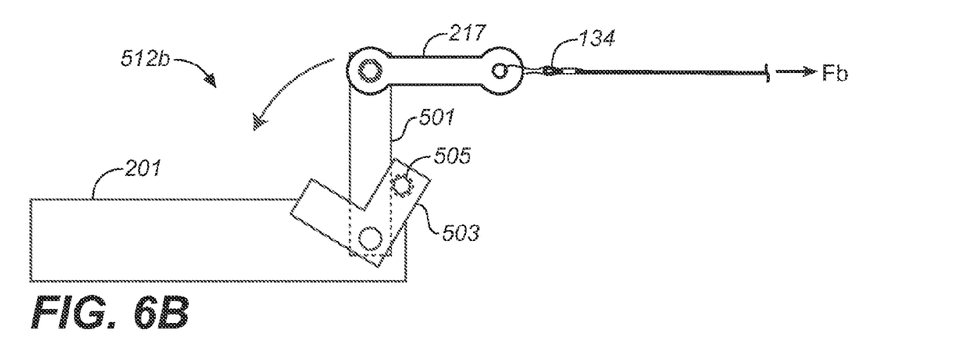
FIG. 6B is the movement mechanism in a second position.
Figure 6C:
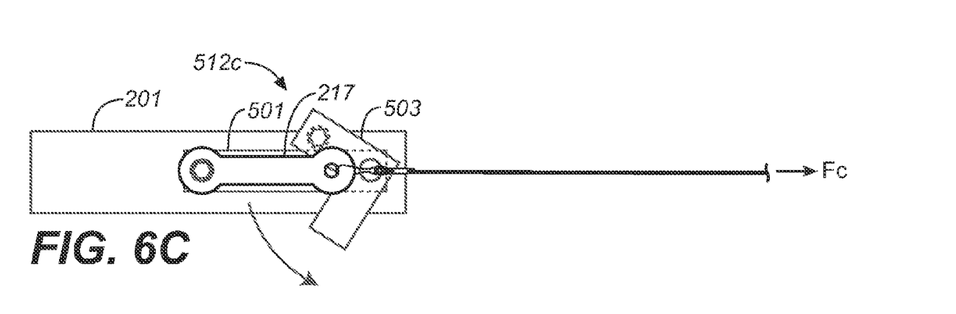
FIG. 6C is the movement mechanism in a third position.
Figure 6D:
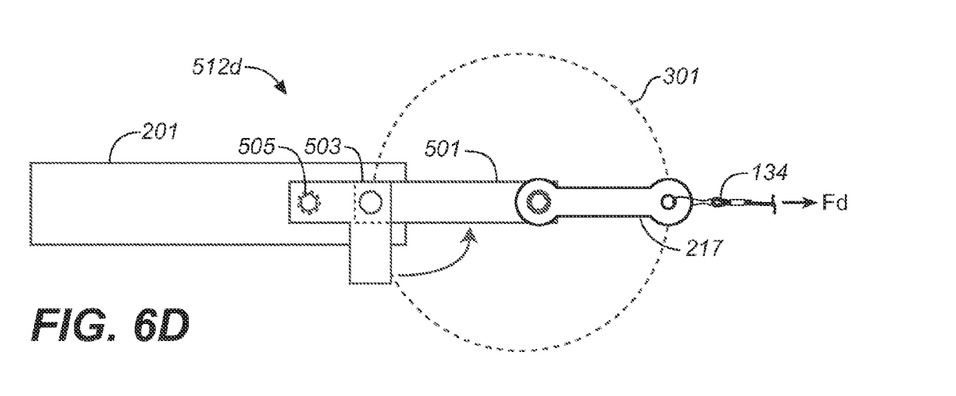
FIG. 6D is the movement mechanism in a fourth position.

A second embodiment stake assembly 510 that can be used with the decoy system of FIG. 1 is shown FIGS. 5, 5A, 5B, 6A, 6B, 6C, and 6D, where FIG. 5 is side view of stake assembly 510, FIG. 5A is a sectional view 5A-5A of FIG. 6A, FIG. 5B is a sectional view 5B-5B of FIG. 6A, and FIGS. 6A-6D are bottom views of the movement mechanism of FIG. 5 in four sequential positions, where: FIG. 6A is the movement mechanism in a first position, FIG. 6B is the movement mechanism in a second position, FIG. 6C is the movement mechanism in a third position, and FIG. 6D is the movement mechanism in a fourth position. Stake assembly 510 is generally similar to stake assembly 110, except as discussed below. As described subsequently, stake assembly 510 causes line end 134 to move in a circular path, as with stake assembly 110, but does so at an uneven rate. The uneven rotational motion of stake assembly 510 causes first end 134, and thus decoys 135, to move in a jerky motion that may be advantageous in attracting certain birds to the decoys.

As shown in FIG. 5, stake assembly 510 includes an element 201 attached to stake 111 that supports movement mechanism 512, which is generally similar to mechanism 112, except as discussed subsequently. Mechanism 512 includes a power source 201 and motor 205 that are both attached to element 201, a shaft 507 that protrudes from and is rotated about its axis by motor 205, a first element 501 that is rotatably attached to shaft 507, a second element 503 is fixedly attached to shaft 507 and includes an element 505, a shaft 213 that is rotatably connected to element 501 at connection 211, and an element 217 that is rotatably attached to shaft 213 and includes line attachment 113 that is coupled to line end 134.

As shown in FIGS. 5A and 5B, shaft 507 is comprised of an inner rod 521 and an outer casing 523. Second element 503 is fixedly attached to inner rod 521, as indicated by weld 511. As is best shown in FIGS. 5A, 5B, and 6A, second element 503 also has a hole 504 that supports an element 505, which includes a bolt 533 through hole 504, a sleeve 513, and a nut 535 to hold the bolt and sleeve in place.

First element 501 includes a hole 502 sized to accept inner rod 521 and is loosely held between casing 523 and second element 503, permitting the first element to rotate about shaft 507. First element 501 also supports shaft 207, which is discussed above, and which is connected to line end 134.

The elements of mechanism 512 interact as follows. The operation of motor 205 causes shaft 507, the attached second element 503, and element 505, which is attached to the second element, to rotate about the axis of the shaft. First element 501 rotates about the axis of shaft 507 as the result of force imparted by element 505 and from forces provided from line 131 via element 217.

The motion of end 134 upon the rotation of shaft 507 is illustrated in FIGS. 6A-6C. The rotation of shaft 507 causes second element 503 to rotate about weld 511. The rotation of second element 503 occurs at the same rate as that of shaft 507, and FIGS. 6A-6C show the position of the mechanism of stake assembly 510 at increasing (but not equal) times. As illustrated in FIGS. 5A and 5B, at certain orientations of pieces 501 and 503, sleeve 531 contacts first element 501. Thus, for example, in FIG. 6A, force Fa applied from end 134 causes element 501 and element 217 to be extended linearly. As shaft 507 rotates, sleeve 531 contacts element 501, causing it to rotate as shown in FIGS. 6B and 6C.

When element 501 is rotated to the position indicated in FIG. 6C, element 501 is pulled, rapidly, to the position shown in FIG. 6D. The motion of end 134 is thus seen to execute a circle at a rate equal to the rotational rate of motor 205 for the first half of the rotation (from the position of FIGS. 6A, to 6B, to 6C), and then snap to the position shown in FIG. 6D. Eventually element 503 rotates to the point where sleeve 531 contacts element 501, and the motion repeats itself. The result is an even pulling of end 134 from the positions shown in FIG. 6A through 6C over half the rotation of motor 205, followed by a snap motion of end 134 back to the position shown in FIG. 6D.

Figure 7:
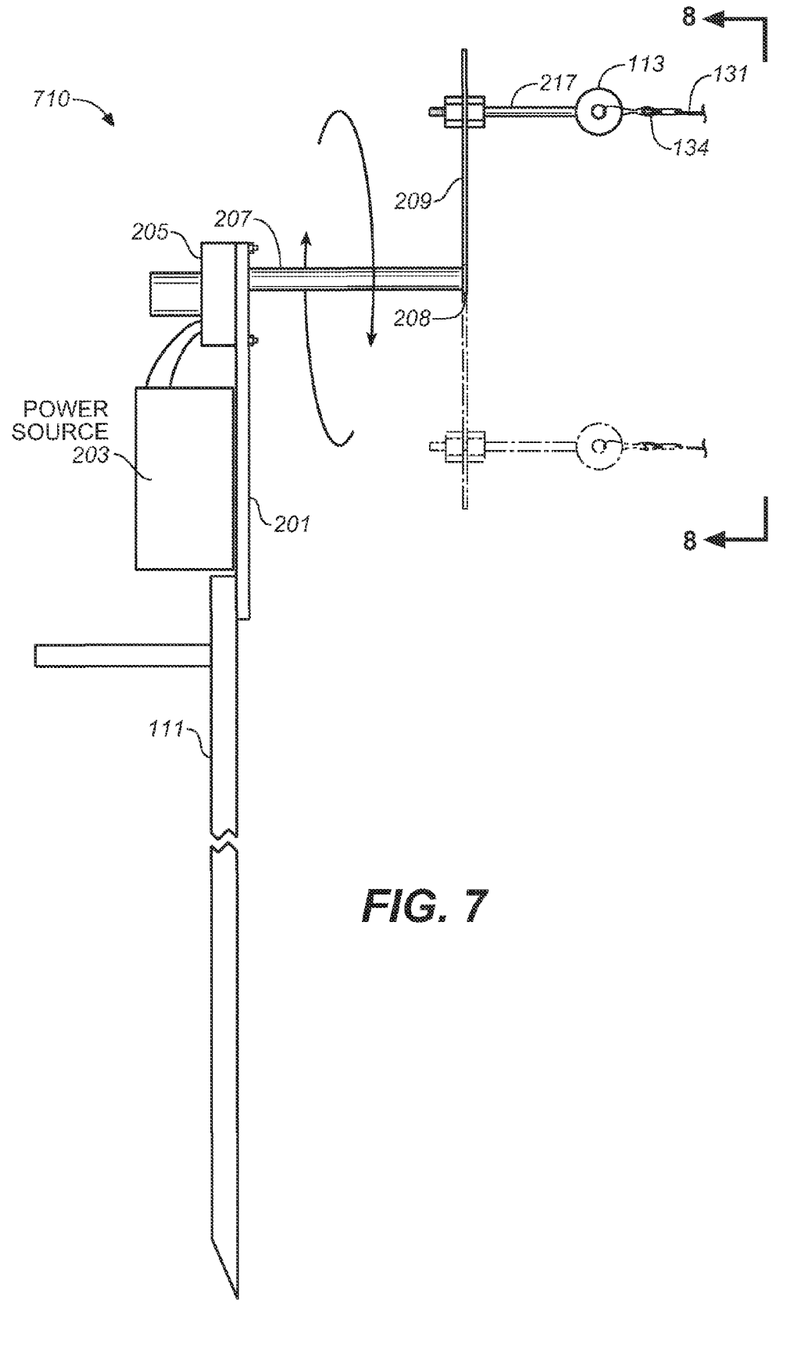
FIG. 7 is a side view of a third embodiment of a stake assembly that can be used with the decoy system of FIG. 1.
Figure 8A:
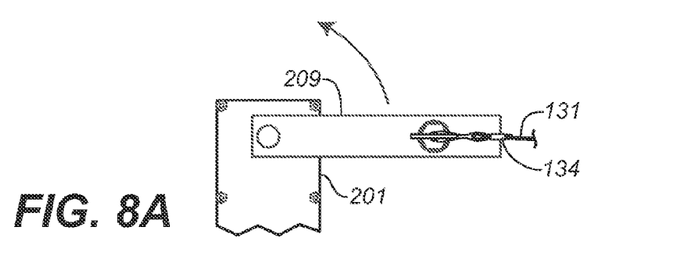
FIG. 8A is the movement mechanism in a first position.
Figure 8B:
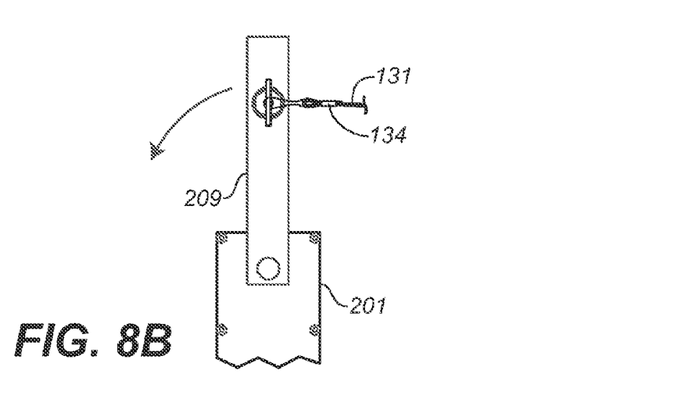
FIG. 8B is the movement mechanism in a second position.
Figure 8C:
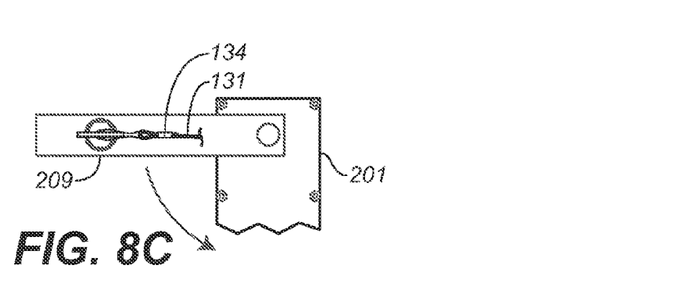
FIG. 8C is the movement mechanism in a third position.
Figure 8D:
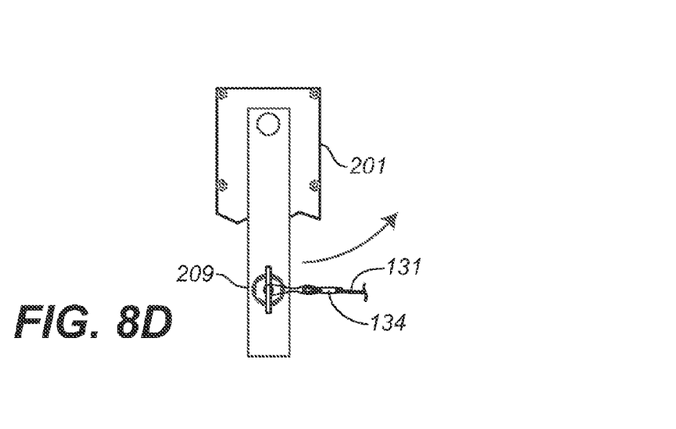
FIG. 8D is the movement mechanism in a fourth position.

FIG. 7 is a side view of a third embodiment of a stake assembly 710 that can be used with the decoy system of FIG. 1; and FIGS. 8A-8D is a side view 8-8 of the movement mechanism of FIG. 7 in four sequential positions, where: FIG. 8A is the movement mechanism in a first position, FIG. 8B is the movement mechanism in a second position, FIG. 8C is the movement mechanism in a third position, and FIG. 8D is the movement mechanism in a fourth position. Stake assembly 710 is generally similar to stake assembly 110, except as discussed below. The main difference being that the rotation of line end 134 of stake assembly 710 is in a vertical plane, as opposed to the horizontal motion of stake assembly 110.

Stake assembly 710 orients shaft 207 horizontally, and thus arm 209 rotates in a vertical plane. A rod 217 extends ways from arm 209 and is attached to line end 134. The resulting motion is illustrated in FIGS. 8A-8C, which shows the motion of line end 134 in a vertical plane. The resulting motion on decoys 135 is circular motion in a vertical plane, and provides a bobbing motion to the decoys.

In alternative embodiments, stake assemblies may be oriented to move line end 134 in an orientation other than in a horizontal or vertical plane.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. A decoy system for moving decoys on the surface of a body of water, said decoy system comprising:
   a first stake assembly for placing in the ground, where said first stake assembly includes a mechanism, where said mechanism includes:
      a motor having a drive shaft with a centerline, where said motor operably rotates said drive shaft about said centerline, alternatively, through a first half of a full rotation and a second half of a full rotation, and
      a rotating assembly attached to said drive shaft including
         a first arm extending generally perpendicular to said centerline, where said first arm includes an element that extends parallel to said centerline and is located at a first radial distance from said centerline, and where said element rotates about said centerline with said drive shaft, and
         a second arm having a first end rotatably coupled to said drive shaft near said first arm, and a second end extending to a second radial distance greater than said first radial distance;
   a second stake assembly for placing in the ground;
   a line in tension between a first end of said line attached to said second end of said rotating assembly and a second end of said line attached to said second stake assembly; and
   one or more decoys attached to said line,
   such that said rotating mechanism moves said first end of said line and said one or more decoys in a first horizontal direction towards the first stake, moves said first end of said line and said one or more decoys in a second horizontal direction opposite the first direction towards the second stake, moves said first end of said line and said one or more decoys in a third horizontal direction perpendicular to the first and second directions, and moves said one of said first end of said line and said one or more decoys in a fourth horizontal direction opposite the third direction,
   such that during said first half of a full rotation of said drive shaft said element of said first arm contacts said second arm and said second arm to rotate with said drive shaft, and said first end of said line and said one of said one or more decoys move in said first horizontal direction followed by said third horizontal direction, such that during said second half of a full rotation of said drive shaft, tension from said line pulls said second end of said second arm in a direction towards said second end of said line, and said first end of said line and said one or more decoys move in said second horizontal direction followed by said fourth horizontal direction, and such that when the motor rotates at a constant rate, the first end of the line and said one or more decoys move in a circular motion at an uneven rate.

2. The decoy system of claim 1, where said mechanism moves said first line end in a circular motion.

3. The decoy system of claim 1, where said line includes an elastic portion.

4. The decoy system of claim 3, where said elastic portion includes a spring.

5. The decoy system of claim 1, where said mechanism that moves said first line end in a horizontal plane.

6. The decoy system of claim 1, where said mechanism that moves said first line end in a vertical plane.

7. A decoy system for moving decoys on the surface of a body of water, said decoy system comprising:
- a line having a first end and a second end, where said first end is attached to a mechanism and where said second end is staked to the ground; and
- one or more floating decoys attached to said line,
- where said mechanism moves said first end and said one or more floating decoys in a first direction away from said second end, a second direction opposite the first direction towards the second end, a third horizontal direction perpendicular to the first and second directions, and a fourth horizontal direction opposite the third direction, and
- where said mechanism moves the first end and said one or more floating decoys, sequentially, in said first direction, said third direction, said second direction, and said fourth direction, where said mechanism includes:
- a motor including a drive shaft having a centerline, where said motor operably rotates said drive shaft about said centerline, and
- a rotating assembly attached to said drive shaft and including an arm having an end coupled to said first end of said line,
- such that the first end of the line moves in a circular motion,
- where said arm is a second arm and where said end of said arm is a second end, where said where said motor operably rotates said drive shaft about said centerline, alternatively, through a first half of a full rotation and a second half of a full rotation, and where said rotating assembly further includes:
- a first arm extending generally perpendicular to said centerline, where said first arm includes an element that extends parallel to said centerline and is located at a first radial distance from said centerline, and where said element rotates about said centerline with said drive shaft,
- where said second arm has a first end rotatably coupled to said drive shaft near said first arm, and where said second end extends to a second radial distance greater than said first radial distance,
- such that during said first half of a full rotation, said element of said first arm contacts said second arm, and said second arm to rotates with said drive shaft, and said first end of said line and said one of said one or more decoys move in said first direction followed by said third direction,
- such that during said second half of a full rotation, tension from said line pulls said second end of said second arm in a direction towards said second end of said line, and said first end of said line and said one or more decoys move in said second horizontal direction followed by said fourth horizontal direction,
- such that when the motor rotates at a constant rate, the first end of the line moves in a circular motion at an uneven rate.

8. The decoy system of claim 7, where said mechanism moves said first line end in a circular motion at an even rate.

9. The decoy system of claim 7, where said mechanism moves said first line end in a circular motion at an uneven rate.

10. The decoy system of claim 7, where said line includes an elastic portion.

11. The decoy system of claim 10, where said elastic portion includes a spring.

12. The decoy system of claim 7, where said mechanism moves said first end in a plane that is horizontal to the surface of the body of water.

13. The decoy system of claim 7, where said mechanism moves said first end in a plane that is vertical to the surface of the body of water.

* * * * *